United States Patent
You et al.

(10) Patent No.: US 10,341,977 B2
(45) Date of Patent: Jul. 2, 2019

(54) METHOD FOR OBTAINING DOWNLINK SYNCHRONIZATION, AND MTC APPARATUS

(71) Applicant: LG ELECTRONICS INC., Seoul (KR)

(72) Inventors: Hyangsun You, Seoul (KR); Yunjung Yi, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 15/508,469

(22) PCT Filed: Sep. 21, 2015

(86) PCT No.: PCT/KR2015/009864
§ 371 (c)(1),
(2) Date: Mar. 2, 2017

(87) PCT Pub. No.: WO2016/043565
PCT Pub. Date: Mar. 24, 2016

(65) Prior Publication Data
US 2017/0280404 A1 Sep. 28, 2017

Related U.S. Application Data

(60) Provisional application No. 62/052,482, filed on Sep. 19, 2014.

(51) Int. Cl.
*H04W 56/00* (2009.01)
*H04L 27/26* (2006.01)
(Continued)

(52) U.S. Cl.
CPC ....... *H04W 56/003* (2013.01); *H04L 27/2655* (2013.01); *H04W 56/00* (2013.01);
(Continued)

(58) Field of Classification Search
None
See application file for complete search history.

(56) References Cited

U.S. PATENT DOCUMENTS 9,553,701 B2 * 1/2017 Sadeghi .................. H04L 5/005
2010/0040015 A1 * 2/2010 Ernstrom .............. H04W 56/00
370/330

(Continued)

FOREIGN PATENT DOCUMENTS

| WO | 2013009107 | 1/2013 |
| WO | 2013015658 | 1/2013 |
| WO | 2013115571 | 8/2013 |

OTHER PUBLICATIONS

PCT International Application No. PCT/KR2015/009864, International Search Report dated Dec. 28, 2015, 2 pages.
(Continued)

*Primary Examiner* — Duc T Duong
(74) *Attorney, Agent, or Firm* — Lee, Hong, Degerman, Kang & Waimey

(57) ABSTRACT

The present specification provides a method for obtaining downlink synchronization in a machine type communication (MTC) apparatus. The MTC apparatus may comprise the steps of: receiving an MTC-dedicated synchronization signal from a base station on the subframe before a subframe which attempts to receive a paging message; obtaining a downlink synchronization of the base station through the synchronization signal; and after obtaining the downlink synchronization, attempting to receive the paging message. Here, the MTC-dedicated synchronization signal may be received on the same sub-band as a sub-band on which the paging message is received, from among the entire system band of the base station.

10 Claims, 14 Drawing Sheets

(51) Int. Cl.
*H04W 72/04* (2009.01)
*H04W 68/00* (2009.01)

(52) U.S. Cl.
CPC ....... *H04W 68/005* (2013.01); *H04W 72/042* (2013.01); *H04W 56/001* (2013.01); *H04W 72/0446* (2013.01); *Y02D 70/00* (2018.01)

(56) References Cited

U.S. PATENT DOCUMENTS

| | | | | |
|---|---|---|---|---|
| 2013/0077579 | A1* | 3/2013 | Cho | H04W 4/20 370/329 |
| 2013/0077582 | A1* | 3/2013 | Kim | H04W 74/006 370/329 |
| 2014/0071957 | A1 | 3/2014 | Xu et al. | |
| 2015/0341974 | A1* | 11/2015 | Wu | H04W 76/023 455/11.1 |
| 2016/0029344 | A1* | 1/2016 | Vannithamby | H04W 4/70 455/458 |
| 2016/0050624 | A1* | 2/2016 | Tirronen | H04W 52/0216 370/311 |
| 2016/0066291 | A1* | 3/2016 | Awad | H04B 7/2656 370/350 |
| 2016/0174056 | A1* | 6/2016 | Nagata | H04W 8/005 370/329 |
| 2016/0212723 | A1* | 7/2016 | Yu | H04W 76/14 |
| 2016/0373215 | A1* | 12/2016 | Nan | H04L 1/08 |
| 2017/0150330 | A1* | 5/2017 | Kim | H04W 4/90 |

OTHER PUBLICATIONS

LG Electronics, "Evaluation on PBCH coverage enchancement for MTC", R1-140303, 3GPP TSG RAN WG1 Meeting #76, Feb. 2014, 6 pages.

* cited by examiner

METHOD FOR OBTAINING DOWNLINK SYNCHRONIZATION, AND MTC APPARATUS

CROSS-REFERENCE TO RELATED APPLICATIONS

This application is the National Stage filing under 35 U.S.C. 371 of International Application No. PCT/KR2015/009864, filed on Sep. 21, 2015, which claims the benefit of U.S. Provisional Application No. 62/052,482, filed on Sep. 19, 2014, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC devices, wide service areas, low traffic for each MTC device, etc.

An MTC device transmits or receives only a small amount of data intermittently and thus it is able to operate in a sleep mode in most of the time for the power saving purpose.

However, if the MTC device operates in the sleep mode for a long time, the MTC device may become out of downlink synchronization with a base station.

SUMMARY OF THE INVENTION

Accordingly, the disclosure of the specification has been made in an effort to solve the problem.

To achieve the above object, there is provided a method for obtaining a downlink synchronization. The method may be performed by a machine type communication (MTC) apparatus. The method includes: receiving, from a base station, an MTC-dedicated synchronization signal on the subframe before a subframe which attempts to receive a paging message; obtaining a downlink synchronization with the base station through the synchronization signal; after obtaining the downlink synchronization, attempting to receive the paging message. Here, the MTC-dedicated synchronization signal is received on a sub-band, on which the paging message is received, within an entire system bandwidth of the base station.

Here, a size of the sub-band on which the paging message and the MTC-dedicated synchronization signal are received may correspond to six physical resource blocks (PRBs) or 1.4 MHz.

The sub-band on which the paging message and the MTC-dedicated synchronization signal may be located in the middle of the entire system bandwidth of the base station.

Alternatively, the sub-band on which the paging message and the MTC-dedicated synchronization signal may not located in the middle of the entire system bandwidth of the base station.

When the sub-band on which the paging message and the MTC-dedicated synchronization signal is not located in the middle of the entire system bandwidth of the base station, a subframe on which the MTC-dedicated synchronization signal is received and a subframe on which the paging message is received may correspond to Multimedia broadcast/multicast service over a Single Frequency Network (MBSFN) subframes.

To achieve the above object, there is provided a machine type communication (MTC) apparatus. The MTC device includes: a receiver configured to receive an MTC-dedicated synchronization signal from a base station on a subframe before a subframe which attempts to receive a paging message; and a processor configured to obtain a downlink synchronization with the base station through the synchronization signal, wherein the processor attempts to receive the paging message after obtaining the downlink synchronization. Here, wherein the MTC-dedicated synchronization signal is received on a sub-band, on which the paging message is received, within an entire system bandwidth of the base station.

According to embodiments of the present invention, the aforementioned problems of the existing technology will be solved.

DESCRIPTION OF EXEMPLARY EMBODIMENTS

Figure 1:
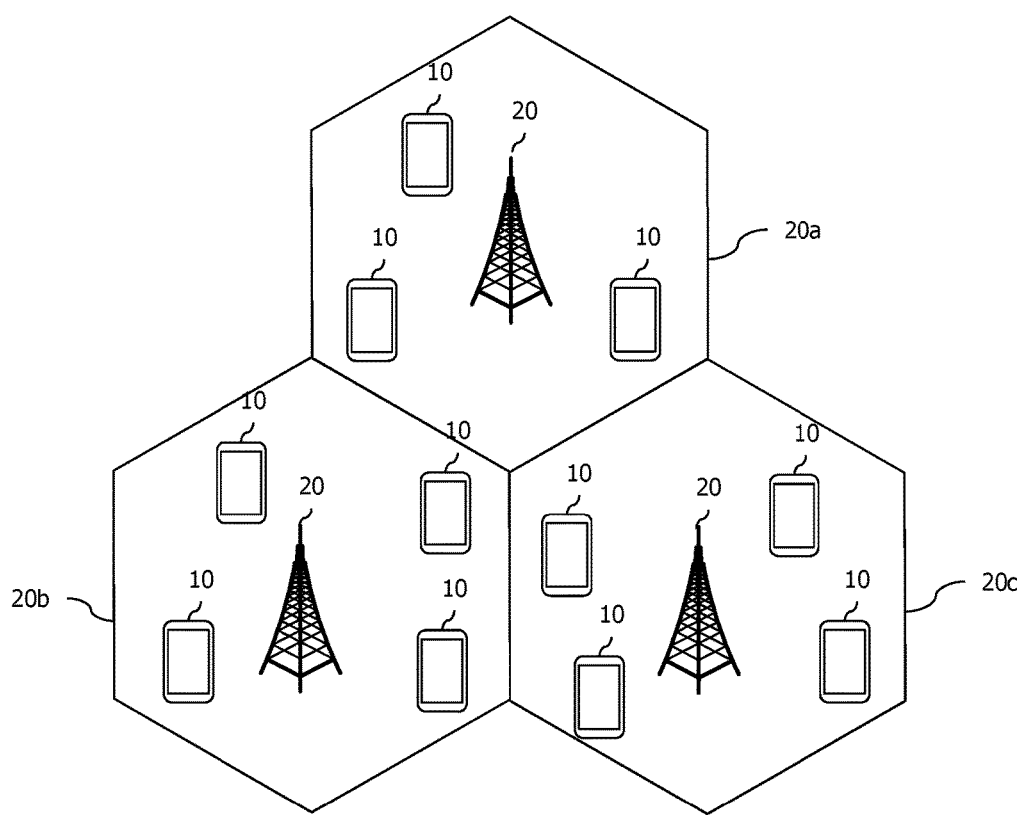
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEl 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Figure 2:
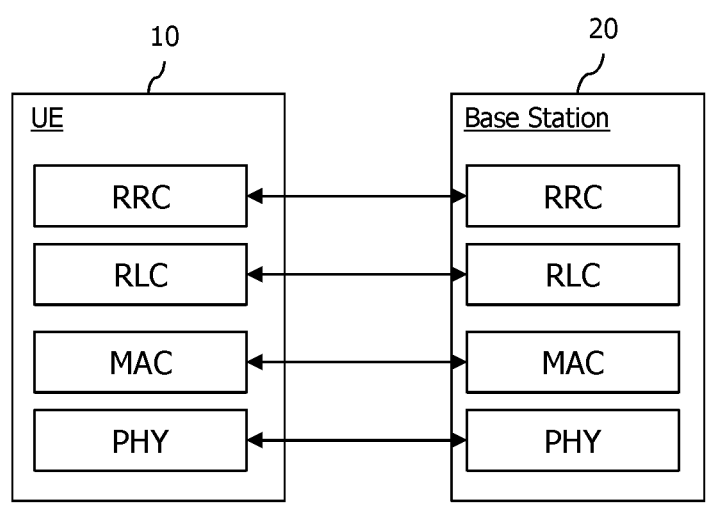
FIG. 2 illustrates an example of a structure of a radio interface protocol in a control plane between a User Equipment (UE) and a base station.

FIG. 2 is a diagram illustrating an exemplary structure of a radio interface protocol on a control plane between an UE and a base station.

The radio interface protocol is horizontally divided into a physical layer, a data link layer, and a network layer, and vertically divided into a user plane for transmission of data information and a control plane for transmission of a control signal.

Such protocol layers may be divided into L1 (the first layer), L2 (the second layer), and L3 (the third layer) based on lower three layers of an Open System Interconnection (ISI) reference model that is known in a communication system.

The first layer is a physical layer, and the second layer includes a Medium Access Control (MAC) layer and a Radio Link Control (RLC) layer. The third layer includes a Radio Resource Control (RRC) layer.

If there is an RRC connection between the RRC layer of the UE 10 and the RRC layer of the base station 20, the UE may remain in an RRC connected mode. If not, the UE may remain in an RRC idle mode.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 3:
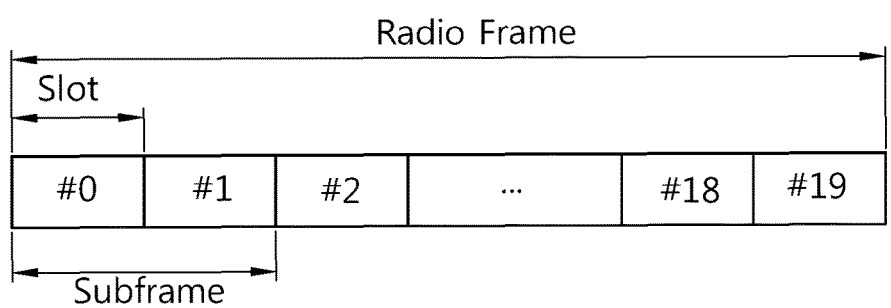
FIG. 3 illustrates the architecture of a radio frame according to frequency division duplex (FDD) of 3rd generation partnership project (3GPP) long term evolution (LTE).

FIG. 3 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 4:
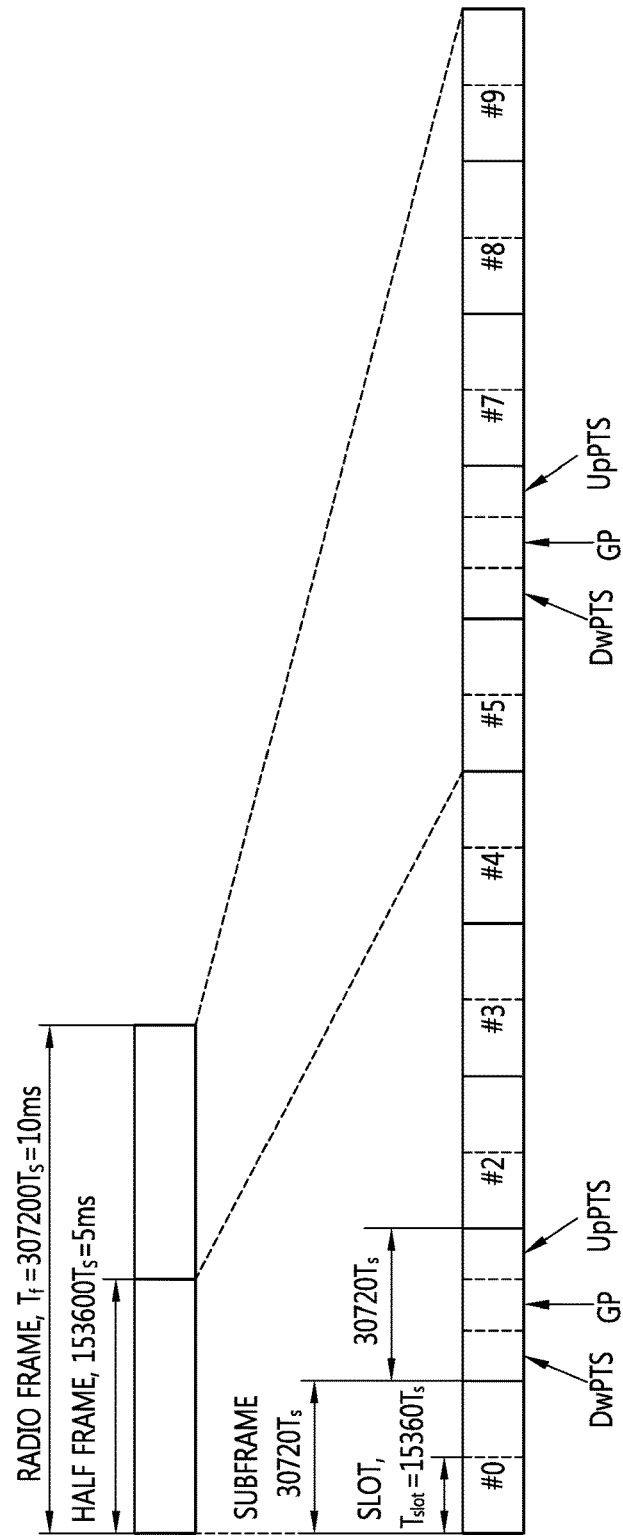
FIG. 4 illustrates the architecture of a downlink radio frame according to time division duplex (TDD) in 3GPP LTE.

FIG. 4 illustrates the architecture of a downlink radio frame according to TDD in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame,
'U' a UL sub-frame, and
'S' a special sub-frame.

When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | | |
| 5 | 6592 * Ts | 4384 * Ts | 5120 * ts | 20480 * Ts | 4384 * Ts | 5120 * ts |
| 6 | 19760 * Ts | | | 23040 * Ts | | |
| 7 | 21952 * Ts | | | — | | |
| 8 | 24144 * Ts | | | — | | |

Figure 5:
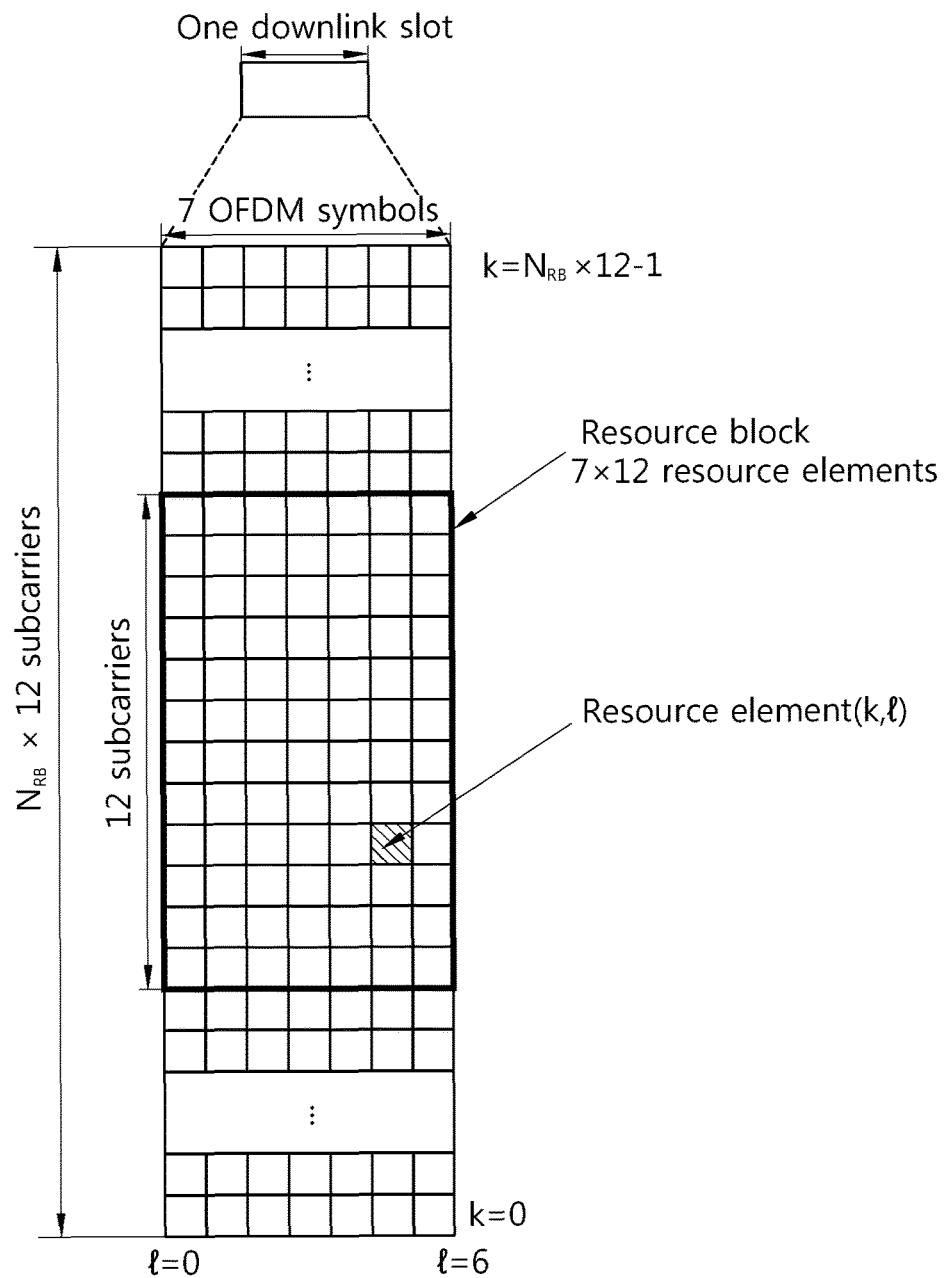
FIG. 5 illustrates an example resource grid for one uplink or downlink slot in 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 5 may also apply to the resource grid for the downlink slot.

Figure 6:
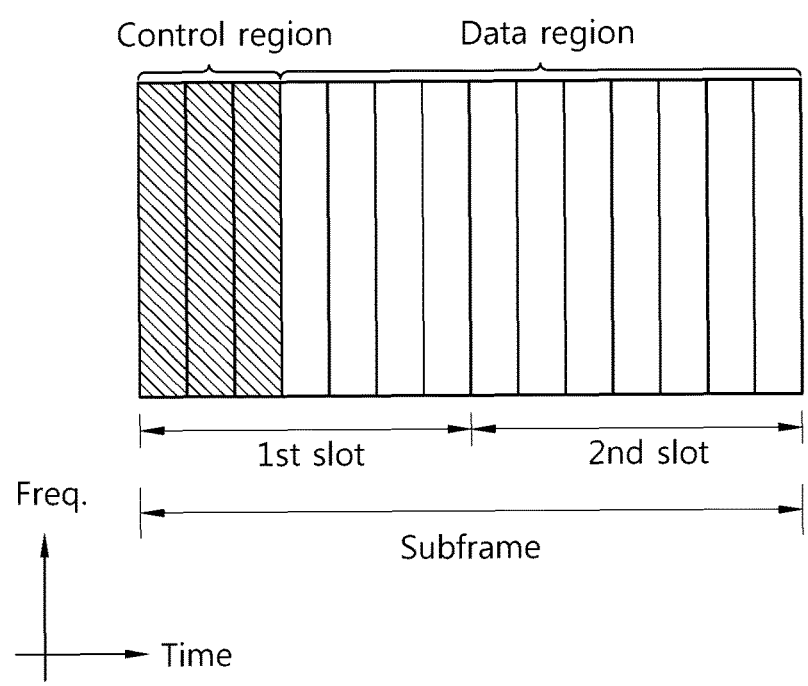
FIG. 6 illustrates the architecture of a downlink subframe.

FIG. 6 illustrates the architecture of a downlink subframe.

In FIG. 6, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 7:
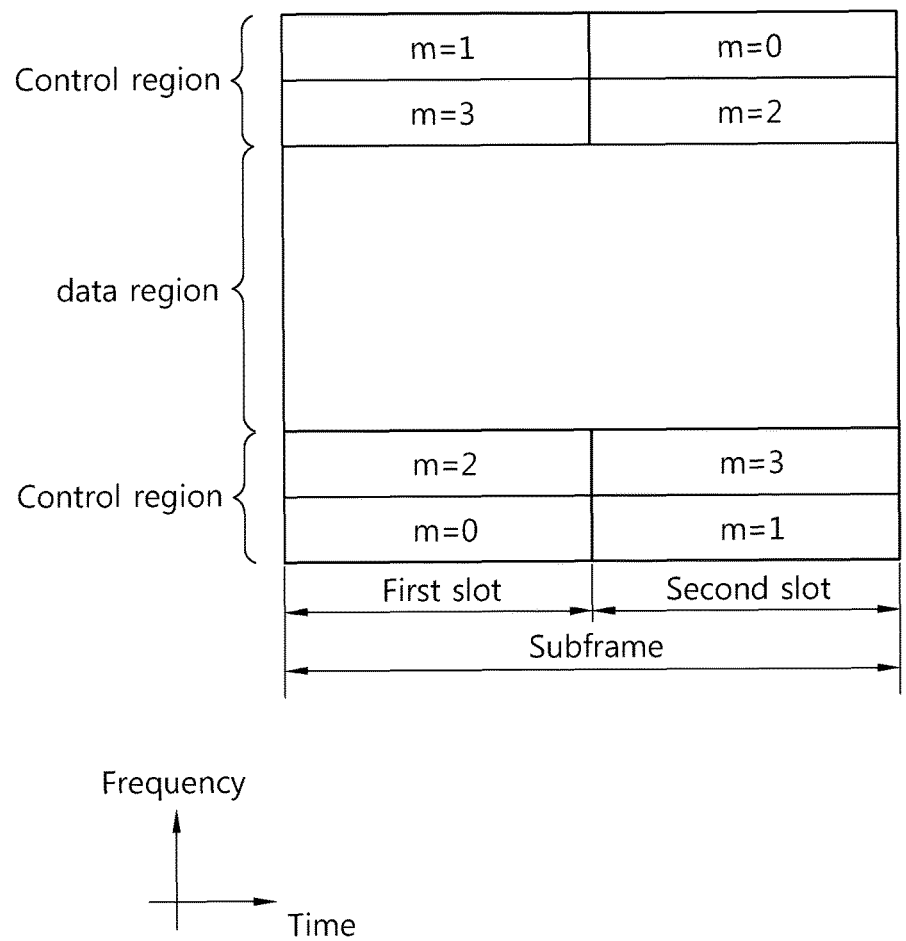
FIG. 7 illustrates the architecture of an uplink subframe in 3GPP LTE.

FIG. 7 illustrates the architecture of an uplink subframe in 3GPP LTE.

Referring to FIG. 7, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation>

Hereinafter, a Carrier Aggregation (CA) system will be described.

The CA system indicates aggregation of multiple Component Carriers (CCs). CA has changed the existing meaning of a cell. Due to the CA, a cell may mean a combination of a downlink CC and an uplink CC, or a single downlink CC.

In addition, a cell in CA may be classified as a primary cell, a secondary cell, or a serving cell. The primary cell indicates a cell which operates at a primary frequency, with which a UE performs initial connection establishment procedure or a connection re-establishment procedure with a base station, or which is a cell indicated as a primary cell in a handover procedure. The secondary cell indicates a cell which operates at a secondary frequency and which is used to provide additional radio resources upon RRC connection establishment.

As described above, unlike a single carrier system, the CA system may support a plurality of CCs, that is, a plurality of serving cells.

Such a CA system may support cross-carrier scheduling. The cross-carrier scheduling includes: allocating a resource of a PDSCH, which is transmitted through a different CC, through a PDCCH transmitted through a specific CC; and allocating a resource of a PUSCH through a CC other than a CC basically linked to the specific CC.

<Synchronization Signal>

Meanwhile, in LTE/LTE-A system, synchronization with a cell is obtained using a synchronization signal (SS) in a procedure for cell search.

Hereinafter, a synchronization signal will be described with reference with drawings.

Figure 8A:
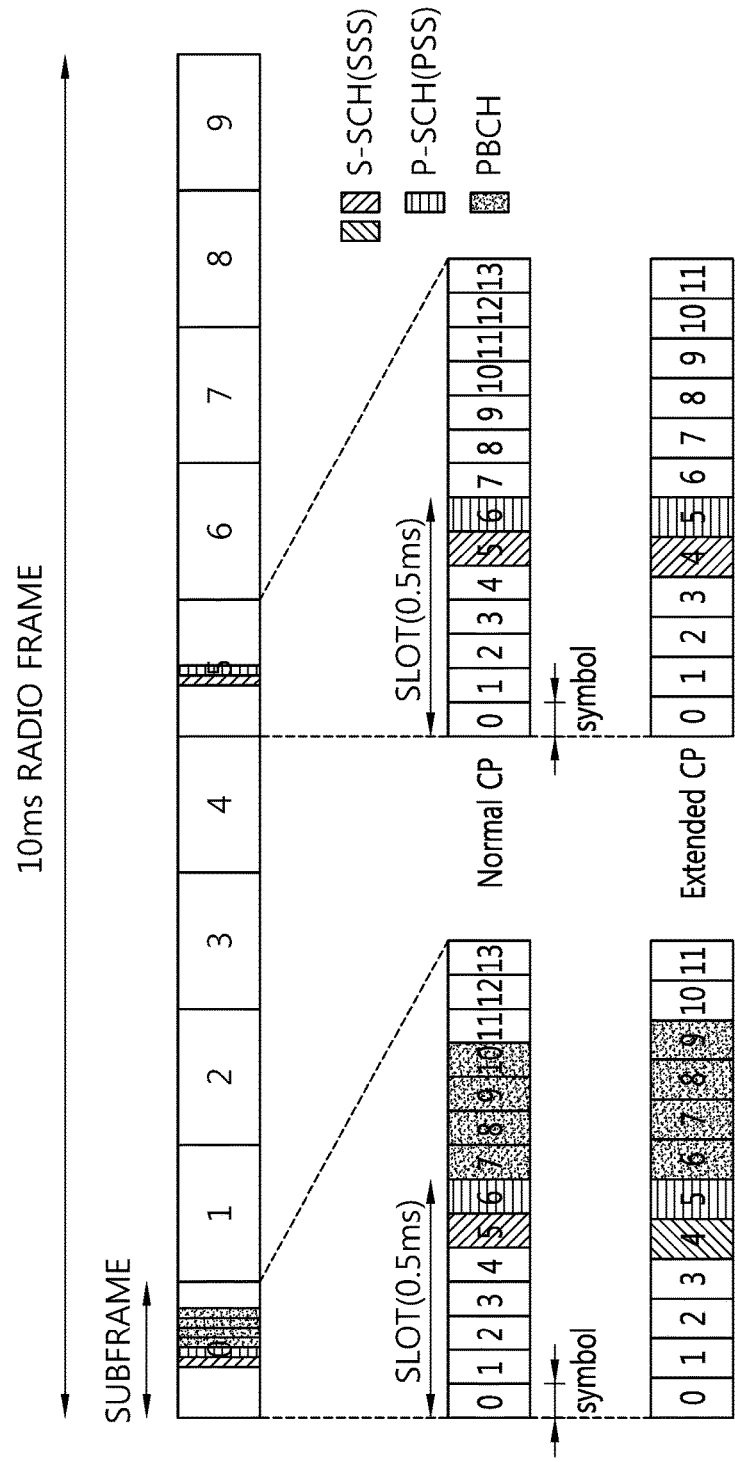
FIG. 8A illustrates a frame structure required for transmission of a synchronization signal within an FDD frame.

FIG. 8A illustrates a frame structure required for transmission of a synchronization signal within an FDD frame.

A slot number and a subframe number starts with 0. An UE may synchronize time and a frequency based on a synchronization signal that is received from a base station. A synchronization signal in 3GPP LTE-A is used for cell search, and may be classified as a primary synchronization signal (PSS) and a secondary synchronization signal (SSS). The synchronization signal of 3GPP LTE-A may be found in the section 6.11 of 3GPP TS V10.2.0 (2011 June).

The PSS is used to obtain an OFDM symbol synchronization or a slot synchronization, and is associated with a physical-layer cell identity (ID) (or PCI). Further, the SSS is used to obtain a frame synchronization. In addition, the SSS is used to detect a CP length and to obtain a physical-layer cell group ID.

The synchronization signal can be transmitted in each of subframes #0 and #5 by considering a global system for mobile communication (GSM) frame length of 4.6 ms to facilitate inter-radio access technology (RAT) measurement. A boundary for the frame can be detected through the SSS. More specifically, in the FDD system, the PSS is transmitted in a last OFDM symbol of 0th and 10th slots, and the SSS is transmitted in an immediately previous OFDM symbol of the PSS.

The synchronization signal can transmit 504 physical cell IDs by combining 3 PSSs and 168 SSSs. A physical broadcast channel (PBCH) is transmitted from the first 4 OFDM symbols of a 1st slot. The synchronization signal and the PBCH are transmitted within 6 Physical Resource Blocks (PRBs) in a system bandwidth, so as to be detected or decoded by a UE irrespective of a transmission bandwidth. A physical channel for transmitting the PSS is called a P-SCH, and a physical channel for transmitting the SSS is called an S-SCH.

Figure 8B:
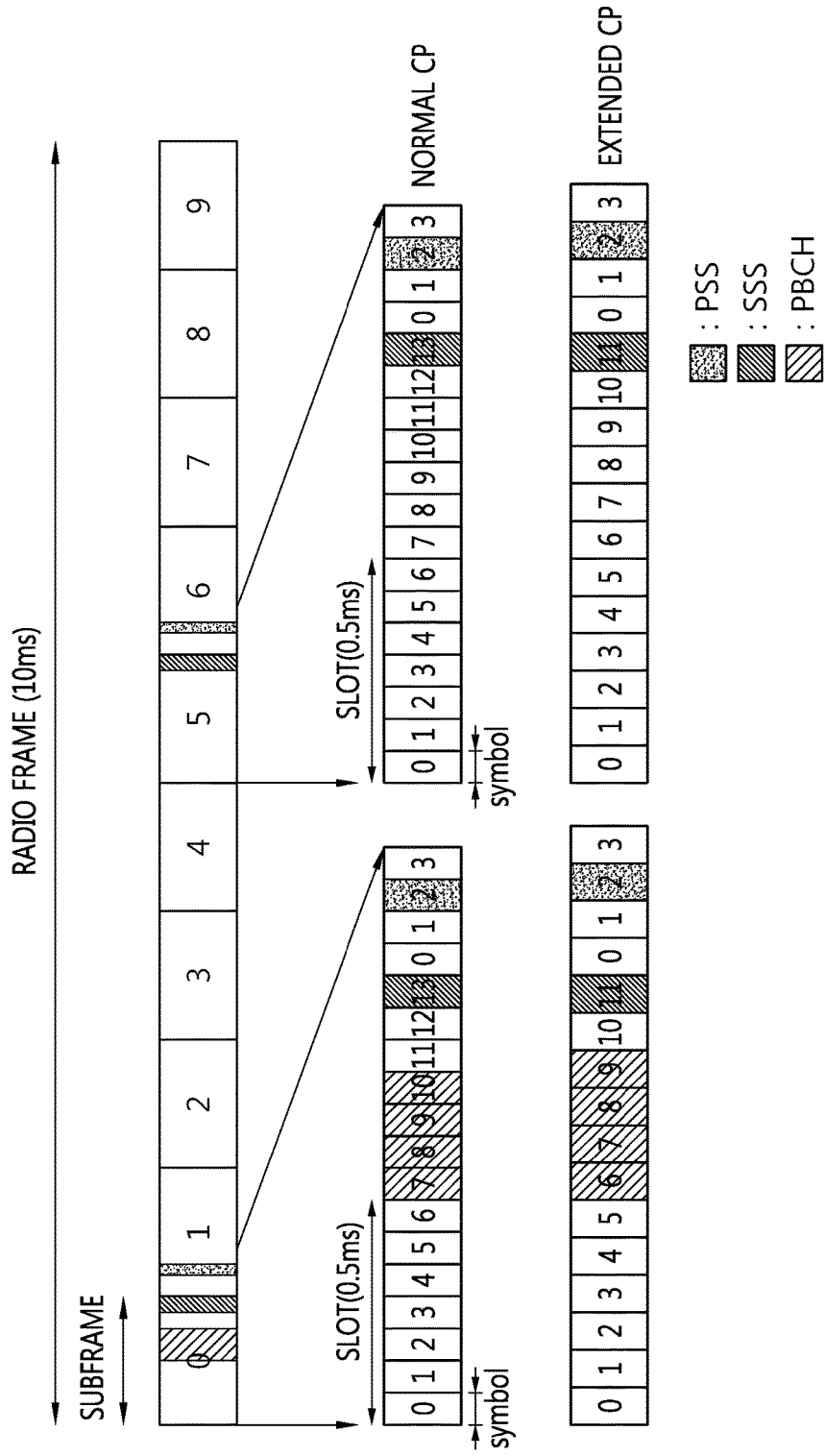
FIG. 8B illustrates a frame structure for transmitting a synchronization signal in a TDD frame.

FIG. 8B illustrates a frame structure for transmitting a synchronization signal in a TDD frame.

In the TDD frame, a PSS is transmitted in a 3rd OFDM symbol of 3rd and 13th slots. An SSS is transmitted three OFDM symbols earlier than the OFDM symbol in which the PSS is transmitted. A PBCH is transmitted in first 4 OFDM symbols of a 2nd slot of a 1st subframe.

<Discontinuous Reception (DRX)>

Hereinafter, discontinuous reception (DRX) in 3GPP LTE will be described.

The DRX allows a terminal to monitor a downlink channel discontinuously in order to reduce battery consumption of a radio device.

Figure 9:
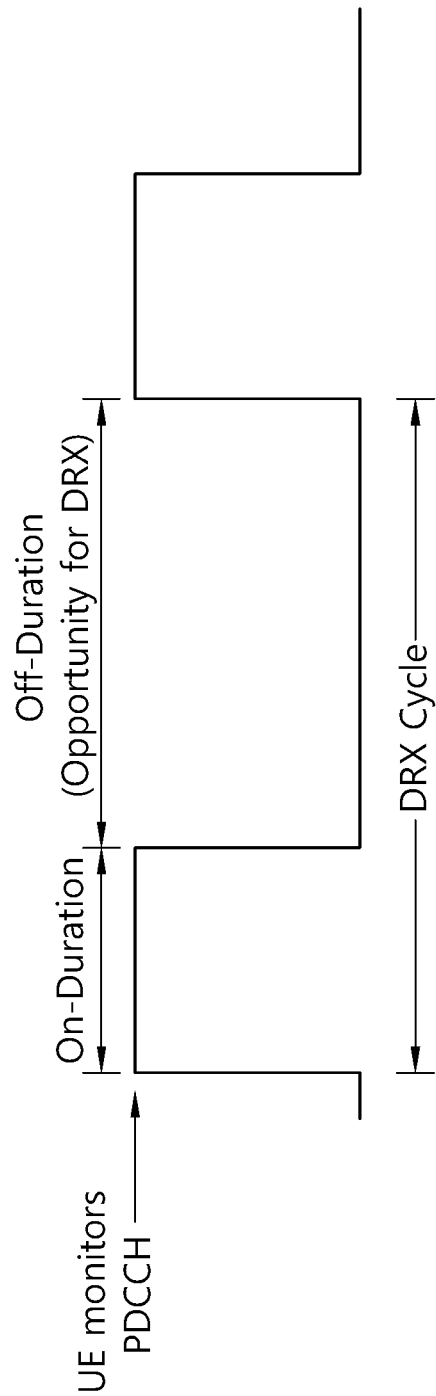
FIG. 9 illustrates an example of a DRX cycle.

FIG. 9 illustrates an example of a DRX cycle.

A DRX cycle specifies periodic repetition of On Duration followed by a possible period of inactivity. The DRX cycle includes On Duration and Off Duration. On Duration is a period of time in which a UE monitors a PDCCH in a DRX cycle.

Once DRX is set, a UE may monitor a PDCCH during On Duration but may not monitor a PDCCH during Off Duration.

To define On Duration, an onDuration timer is used. The On Duration may be defined as a period in which the onDuration timer is being operated. The onDuration timer specifies the number of consecutive PDCCH-subframe(s) at the beginning of the DRX cycle. A PDCCH-subframe indicates a subframe that is monitored by a PDCCH.

In addition to a DRX cycle, other periods in which a PDCCH is monitored may be defined. A time duration during which a PDCCH is monitored is collectively referred to Active time. The Active time may consist of an On Duration during which an UE periodically monitors the PDCCH, and a time duration during which the UE monitors the PDCCH upon occurrence of an event.

<Machine Type Communication (MTC)>

Hereinafter, MTC will be described in detail.

Figure 10A:
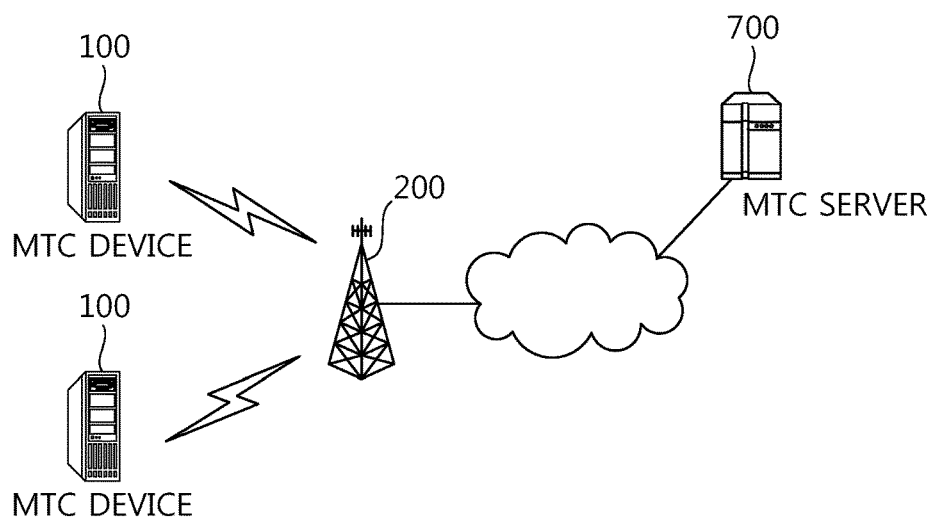
FIG. 10A illustrates an example of MTC.

FIG. 10A illustrates an example of MTC.

The MTC indicates information exchange via a base station 200 between MTC devices 100, which does not require human interaction, and information exchange via a base station between an MTC device 100 and an MTC server 700.

The MTC server 700 is an entity that communicates with the MTC device. The MTC server 700 executes an MTC application, and provides an MTC-dedicated service to the MTC device.

The MTC device 100 is a radio device which provides MTC communication, and may be fixed or mobile.

A service provided over MTC is distinctive from a service provided over existing communication requiring human interaction, and the service provided over MTC may be a service such as tracking, metering, payment, medical service, remote control, etc. More specifically, a service provided over MTC may be used for metering, road information, water level measurement, use of a surveillance camera, stock report of a vending machine, etc.

An MTC device transmits a small amount of data and intermittently transmits or receives uplink/downlink data, and thus, it is efficient to reduce costs of the MTC device and reduce battery consumption thereof in consideration of the low data transmission rate. The MTC device has low mobility and thus, a channel environment thereof is seldom changed.

Figure 10B:
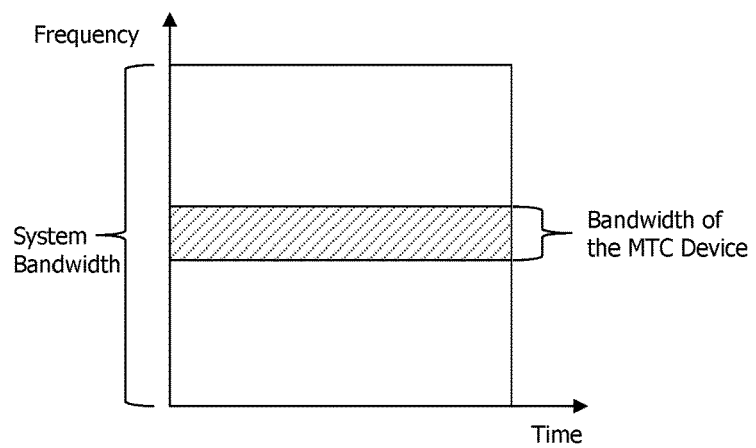
FIG. 10B is a diagram illustrating an example of reducing a transmission bandwidth of an MTC device.

FIG. 10B is a diagram illustrating an example of reducing a transmission bandwidth of an MTC device.

As one of ways for reducing costs of an MTC device, the MTC device may use a bandwidth (a reduced downlink bandwidth and a reduced uplink bandwidth) which is reduced, i.e., approximately to 1.4 MHz, regardless a system bandwidth of a cell shown in FIG. 10B.

Figure 10C:
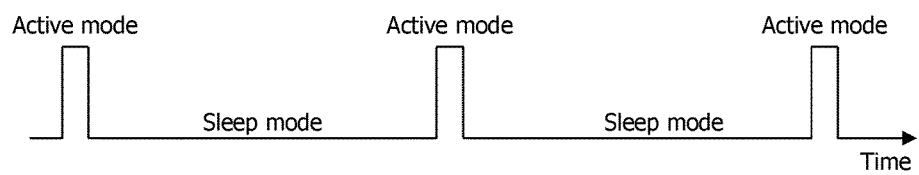
FIG. 10C is a diagram illustrating an example of a sleep mode and an active mode of the MTC device.

FIG. 10C is a diagram illustrating an example of a sleep mode and an active mode of the MTC device.

Meanwhile, because the MTC device intermittently transmits/receives a small amount of data, the MTC device may operate in a sleep mode for most of the time for a power saving purpose, as shown in FIG. 10C.

However, if the MTC operates in the sleep mode for a long time, the MTC device may be out of downlink synchronization with a base station. Thus, when the MTC device wishes to transmit or receive data after switching from the sleep mode to the active mode, a procedure of re-synchronizing with the base station needs to be performed again. However, such a procedure may be regarded huge overhead for the MTC device in terms of time or power consumption.

<Disclosure of the Present Invention>

Thus, the disclosure of the present invention aims to solve the above problem.

Specifically, the disclosure of the present invention proposes a method of efficiently synchronizing with a base station when an MTC device wants to transmit/receive data with the base station while operating in a sleep mode or after waking up from the sleep mode. By doing so, it is possible to reduce overheads, compared to an existing technology, and reduce power consumption of the MTC device.

More specifically, the disclosure of the present invention allows a base station to transmit a simple-type synchronization signal (for example, a synchronization signal in the form of a preamble) (hereinafter, referred to as an MTC_SS) at a time when an MTC device attempts to receive a downlink channel while operating in the sleep mode or after waking up from the sleep mode, thereby reducing a time required for the MTC device to obtain downlink synchronization.

Hereinafter, a MTC_SS will be described for the purpose of quick downlink synchronization of an MTC device that has woke up from the sleep mode, but the MTC_SS may be also used for general synchronization (for example, synchronization for an initial access) of the MTC device.

Hereinafter, an MTC_SS will be described in terms of a transmission timing, a transmission frequency region, structure, and an antenna port.

1. Transmission Timing of MTC_SS (Location of a Subframe)

Hereinafter, a transmission timing of an MTC_SS (a location of a subframe to be transmitted) will be described.

There are largely two cases where an MTC device attempts to receive a data channel/control channel from a base station while operating in a sleep mode or after waking up from the sleep mode.

The first case is a case where the MTC device in an RRC idle mode periodically attempts to receive a paging message from the base station. The second case is a case where the MTC device attempts to receive a PDCCH from the base station during On duration which follows Off duration in a DRX cycle, as shown in FIG. 9.

Hereinafter, methods for the above two cases will be described.

(1) Case Where an MTC Device in an RRC Idle Mode Attempts to Receive a Paging Message When a MTC device attempts to receive a paging from a base station in case the MTC device is in an RRC idle mode and a DRX is set, the MTC device may receive an MTC_SS from the base station at a timing location as below.

a) Option 1: an MTC_SS may be received from a base station on a subframe before a paging subframe. Hereinafter, Option 1 will be described with reference to FIG. 11.

Figure 11:
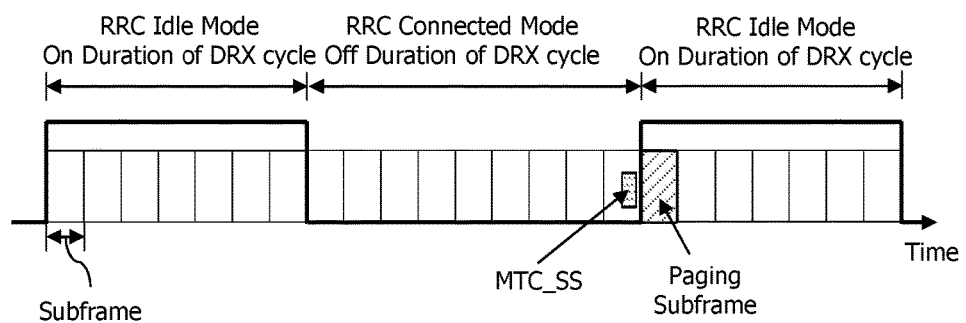
FIG. 11 illustrates a timing of an MTC_SS in a case where an MTC device in an RRC idle mode attempts to receive a paging message.

FIG. 11 illustrates a timing of an MTC_SS in a case where an MTC device in an RRC idle mode attempts to receive a paging message.

As shown in FIG. 11, the MTC_SS may be received from the base station on a subframe before a paging subframe.

The paging subframe may indicate i) a subframe on which a PDSCH including a paging message is received, or ii) a subframe on which an (E)PDCCH scrambled into P_RNTI is received for scheduling a PDSCH including a paging message.

In other words, the MTC device may receive an MTC_SS on a subframe before a subframe which attempts to receive a paging message.

In this case, the MTC_SS may be received on the last four (or six) OFDM symbols of a subframe before the paging subframe.

a) Option 2: an MTC_SS may be received on a paging subframe. The paging subframe is the same as described before. In this case, the MTC_SS may be received on OFDM symbols #3, #4, #5, #6 of the paging subframe.

(2) Case where an MTC Device Attempts to Receive a PDCCH or Transmits an Uplink when the MTC Device is in an RRC Connected Mode and a DRX is Set.

When an MTC device is in the RRC connected mode and a DRX is set, the MTC device may attempt to receive a PDCCH during On duration following Off duration of a DRX cycle, as shown in FIG. 9. Thus, when the MTC device attempts to receive a PDCCH during On duration of the DRX cycle, it is possible to receive an MTC_SS from a base station at a timing location as below.

a) AN MTC_SS may be received from a base station on a subframe in which the DRX cycle ends, the subframe which is, in other words, the last subframe of the DRX cycle. That is, the subframe is a subframe before a subframe on which On duration is imminent to start.

More specifically, the MTC_SS may be 1) received from the base station on a subframe in which each DRX cycle ends (that is, a subframe before a subframe on which On duration starts) or ii) received on a subframe before a subframe on which On duration, where a PDCCH for the MTC device exists, starts. Alternatively, an MTC_SS may be received from the base station once in multiple DRX cycles (for example, three DRX cycles).

In this case, the MTC_SS may be received from the base station, i.e., on the last four (or six) OFDM symbols of a subframe before a paging subframe.

b) an MTC_SS may be received from the base station on a subframe following a subframe where a DRX cycle ends, i.e., a subframe where On duration starts. Alternatively, an MTC_SS may be received from the base station once in multiple DRX cycles (for example, three DRX cycles).

More specifically, the MTC_SS may be received from the base station on i) a subframe following a subframe where each DRX cycle ends, i.e., a subframe before a subframe where On duration starts, or ii) a subframe following a subframe on which a DRX cycle including On duration, where a PDCCH for the MTC device exists, ends, i.e., a subframe on which On duration starts. Alternatively, the MTC_SS may be received from the base station 1) a subframe following a subframe where multiple DRX cycle (for example, three DRX cycles) end, or 2) a subframe following a subframe on which multiple DRX cycles (for example, three DRX cycles) including On duration, where a PDCCH for the MTC device exists, end, In this case, the MTC_SS may be received, i.e., on OFDM symbols #3, #4, #5, and #6 of a paging subframe.

In addition, the MTC_SS may be transmitted at a timing as below.

(3) Transmission of an MTC_SS on a Multimedia Broadcast/Multicast Service Over a Single Frequency Network (MBSFN) Subframe As described above, as one of ways to reduce costs of an MTC device, it is possible to use a bandwidth (a reduced downlink bandwidth and a reduced uplink bandwidth) which is reduced, i.e., approximately to 1.4 MHz, regardless a system bandwidth of a cell shown in FIG. 10B. In this case, the reduced downlink bandwidth for the MTC device may be 1.4 MHx, as shown in FIG. 12.

Figure 12:
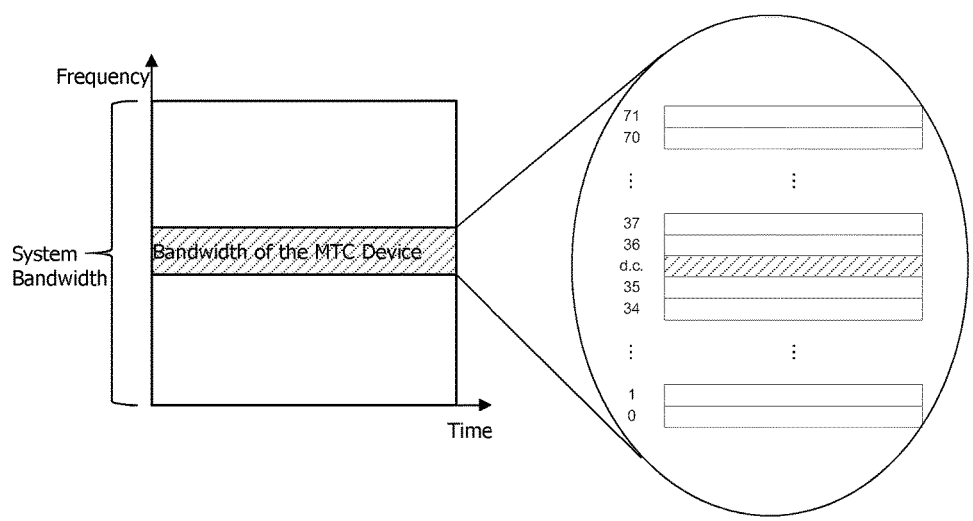
FIG. 12 is a diagram illustrating an example of a subcarrier included in a transmission bandwidth that is used by an MTC device.

FIG. 12 is a diagram illustrating an example of a subcarrier included in a transmission bandwidth that is used by an MTC device.

As found with reference to FIG. 12, a reduced downlink bandwidth for the MTC device, i.e., 1.4 MHZ (=6 PRBs) is located in the middle portion of a system bandwidth. At this point, the reduced bandwidth, i.e., 1.4 MHz (=6 PRBs) includes 73 subcarriers in total. However, there are 72 subcarriers, except d.c. tone in the middle, and a subcarrier index is given, except d.c. tone.

Meanwhile, it is possible to consider locating the reduced downlink bandwidth for the MTC device in a position other than the middle of the system bandwidth. If the downlink bandwidth is not located in the middle of the system bandwidth, the reduced downlink bandwidth may not include d.c. tone and thus may include 6 PRBs that includes 72 consecutive subcarriers.

However, if the downlink bandwidth is not located in the middle of the system bandwidth, it may cause a problem in operation of the MTC device.

A simple way to solve this problem is allowing an MTC device, which uses a reduced transmission bandwidth for cutting down manufacturing costs, to operate only on an MBSFN subframe. In this case, the MTC device may use the reduced transmission bandwidth on OFDM symbols other than OFDM symbols that are necessary to receive a PDCCH on the MBSFN subframe, In a case where the MTC device using the reduced transmission bandwidth for cutting down manufacturing costs is allowed to operate only on an MBSFN subframe, the base station may transmit an MTC_SS for the MTC device only on the MBSFN subframe. In this case, as described above, when the MTC device being in an RRC idle mode attempts to receive a paging message, the paging subframe has to exist within the MBSFN subframe. In addition, as described above, in a case where the MTC device is in the RRC connected mode and an DRX is used, if an MTC device is transitioned to an active state of the RRC connected mode, the last frame in which a DRX cycle ends, i.e., the last subframe of a DRX mode, should be an MBSFN subframe. In addition, a subframe following the subframe where an DRX cycle ends, i.e., the first subframe of the active state of the RRC connected mode, should be an MBSFN subframe.

(4) Transmission of an MTC_SS on an Existing Subframe where a PSS/SSS are to be Transmitted Even in a case where a base station transmits an MTC_SS for quick synchronization of an MTC device, if the MTC device is able to utilize both of the MTC_SS and the existing PSS/SSS, the MTC device may obtain synchronization more quickly and more accurately. Thus, the base station may transmit an MTC_SS for the MTC device on subframe #0 and/or #5 in the FDD environment, and may transmit the same on subframe #0, #1, #5, and/or in the TDD environment.

II. Transmission Frequency Region of an MTC_SS

In a case where an MTC device operates using a reduced bandwidth, i.e., 1.4 MHz, in order to cut down manufacturing costs, regardless of a system bandwidth of a cell, the MTC_SS transmitted for the MTC device may be received only in a sub-band region across the entire frequency region of the cell, the sub-band region in which the MTC device is able to operate. At this point, the transmission frequency region of the MTC_SS may be as below.

Option 1: A base station is able to transmit an MTC_SS only in 6 PRB regions in the system bandwidth. In this case, to perform synchronization, the MTC device has to receive the MTC_SS in the 6 PRBs in the system bandwidth.

Option 2: A base station may set a frequency region (or a sub-band region), in which an MTC_SS is transmitted, to the MTC device through SIB or RRC signaling. In this case, the MTC device may receive the MTC_SS in the frequency region that is known through SIB or RRC signaling.

Option 3: An MTC device may assume that an MTC_SS is received in a frequency region (sub-band region) which was the last frequency region to operate or configured before the MTC device transitioned to an DRX mode (DRX of an RRC connected mode and/or DRX of an RRC idle state), Option 4: In a case where an MTC device receives a paging message in the DRX of the RRC idle mode, the MTC device may assume that an MTC_SS is received in a frequency region (or a sub-band region) for receiving the paging message. That is, it is possible to assume that an MTC_SS is received through a frequency region (sub-band region) in which a PDSCH including a paging message and/or an (E)PDCCH for scheduling the corresponding PDSCH is received. It is because, when the MTC device receives a paging message in DRX of the RRC idle mode, a frequency region (sub-band region) in which the MTC_SS is received may be related to a frequency region (sub-band region) in which a PDSCH including the paging message and/or an (E)PDCCH for scheduling the corresponding PDSCH is received.

The MTC device may identify a frequency region (sub-band region), in which an MTC_SS is able to be received, according to one of the following options.

Option A: A base station may set a frequency region (sub-band region), in which transmits a PDSCH including a paging message and/or (E)PDCCH for scheduling the PDSCH is received, to an MTC device through SIB or RRC signaling.

Option B: In DRX of an RRC idle mode, it is possible to assume that a frequency region (sub-band region), in which a PDSCH including a paging message and/or (E)PDCCH for scheduling the corresponding PDSCH is received, is the same as a frequency region (sub-band region) which was the last frequency region to operate or be configured before the MTC device transitioned to the DRX mode (DRX of an RRC connected mode and/or DRX of an RRC idle mode).

III. Structure of an MTC_SS

An MTC_SS which may be received in the above-described situation needs to be designed in order to prevent an existing UE from confusing the MTC_SS with or an existing PSS/SSS (or a Sidelink Synchronization Signal) (or erroneous detection). The following are methods used for this purpose. One or a combination of the following methods may be used for transmission of an MTC_SS.

1) Method 1: New Root Index

An MTC_SS may include an MTC_PSS and a PTC_SSS. The MTC_PSS included in the MTC_SS may be generated using a new root index that has not been used in the existing PSS/SSS (or a Sidelink Synchronization Signal).

2) Method 2: Different Scrambling Sequence

Additional scrambling may have been applied to an MTC_PSS and an MTC_SSS included in an MTC_SS. In this case, when the MTC_SS is transmitted on a plurality of OFDM symbols, additional scrambling may be applied to some of the OFDM symbols.

3) Method 3: Change a Transmission Order of an MTC_PSS and an MTC_SSS

An MTC_SS may be multiple repetitions of an existing PSS and an existing SSS on time axis. In other words, the MTC_SS may consist of a plurality of MTC_PSS repeatedly transmitted on a plurality of OFDM symbols, and an MTC_SSS repeatedly transmitted on a plurality of OFDM symbols. In Sidelink Synchronization Signal this case, if the MTC_PSS occupies two OFDM symbols on time axis, the MTC_PSS may include MTC_PSS#0 and MTC_PSS#1 which are respectively transmitted on different OFDM symbols. In addition, if the MTC_SSS occupies two OFDM symbols on time axis 2, the MTC_SSS may include MTC_SSS#0 and MTC_SSS#1 which are respectively transmitted on different OFDM symbols. In this case, to prevent confusion with the existing PSS/SSS (or a Sidelink Synchronization Signal), the MTC_SS may be transmitted in the following order.

Transmission Order 1: MTC_PSS#0, MTC_PSS#1, MTC_SSS#0, and MTC_SSS#1 which are respectively transmitted on OFDM symbols #n, #n+1, #n+2, and #n+3

Transmission Order 2: MTC_PSS#0, MTC_SSS#0, MTC_PSS#1, and MTC_SSS#1 which are respectively transmitted on OFDM symbols #n, #n+1, #n+2, and #n+3

4) Method 4: MTC_SS Includes Only an SSS (MTC_SSS)

Even after an MTC_MTC device wakes up from a sleep mode, the apparatus may not be seriously out of synchronization. In particular, an MTC device which is hardly in a mobile state may obtain time synchronization simply by performing fine synchronization. In this case, an MTC_SS may include an SSS (that is, an MTC_SSS). It may be helpful to prevent recognition of the MTC_SS as an existing PSS/SSS (or a Sidelink Synchronization Signal).

In this case, the MTC_SS may occupy, i.e., two (or three) OFDM symbols on time axis. That is, two (or three) MTC_SSs may be transmitted repeatedly.

IV. Transmission Antenna Port of an MTC_SS

Even in a case where an MTC_SS is transmitted for quick synchronization of an MTC device, if the MTC device is able to utilize an MTC_SS and an existing PSS/SSS together for synchronization, the MTC device may perform the synchronization more quickly and accurately.

Thus, to utilize the existing PSS/SSS in addition to the MTC_SS for synchronization with the base station, the MTC device may set an antenna port used for transmission of the MTC_SS to be the same as an antenna port used for transmission of the existing PSS/SSS.

Alternatively, to utilize the existing PSS/SSS in addition to the MTC_SS for synchronization with the base station, the MTC device may assume that an antenna port used for transmission of the MTC_SS and the antenna port used for transmission of the existing PSS/SSS are quasi co-located.

It is obvious that the description provided above is capable of being applied not only to an MTC device, but to general UEs.

The aforementioned embodiments of the present invention may be implemented using various means. For example, the embodiments of the present invention may be implemented as hardware, firmware, software, or a combination thereof. Detailed description thereof will be provided with reference with a drawing.

Figure 13:
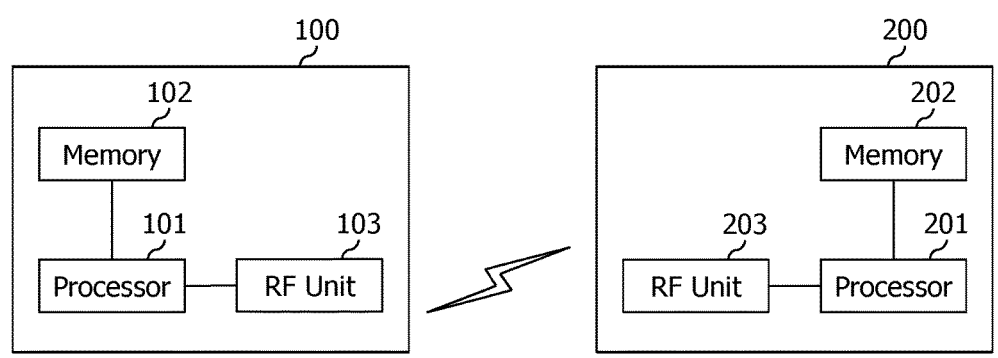
FIG. 13 is a block diagram illustrating a wireless communication system that implements the disclosure of the present invention.

FIG. 13 is a block diagram illustrating a wireless communication system that implements the disclosure of the present invention.

A base station 200 includes a processor 201, a memory 202, and a Radio Frequency (RF) unit 203. The memory 202 is connected to the processor 201 to store various types of information required to drive the processor 201. The RF unit 203 is connected to the processor 201 to transmit and/or receive a radio signal. The processor 201 implements the proposed functions, procedures, and/or methods. In the aforementioned embodiments, operations of a base station may be implemented by the processor 201.

The MTC device 100 includes a processor, a memory 102, and an RF unit 103. The memory 102 is connected to the processor 101 to store various types of information required to drive the processor 101. The RF unit 103 is connected to the processor 101 to transmit and/or receive a radio signal. The processor 101 implements the proposed functions, procedures, and/or methods.

A processor may include Application-Specific Integrated Circuits (ASICs), other chipsets, logic circuits, and/or data processors. A memory may include Read-Only Memory (ROM), Random Access Memory (RAM), flash memory, memory cards, storage media and/or other storage devices. An RF unit may include a baseband circuit for processing a radio signal. When the above-described embodiments are implemented as software, the above-described scheme may be implemented using a module (process or function) which performs the above function. The module may be stored in the memory and executed by the processor. The memory may be disposed to the processor internally or externally and connected to the processor using a variety of known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for obtaining a downlink synchronization, the method performed by a bandwidth reduced device and comprising:
   receiving, from a base station, a dedicated synchronization signal on a first subframe before a second subframe which attempts to receive a paging message, wherein the dedicated synchronization signal is dedicatedly used for the bandwidth reduced device;
   obtaining the downlink synchronization with the base station based on the dedicated synchronization signal; and
   after obtaining the downlink synchronization, attempting to receive the paging message,
   wherein the dedicated synchronization signal is received on a sub-band which is same as a sub-band on which the paging message is received, within an entire system bandwidth of the base station.

2. The method of claim 1, wherein a size of the sub-band on which the paging message and the dedicated synchronization signal are received corresponds to six physical resource blocks (PRBs) or 1.4 MHz.

3. The method of claim 1, wherein the sub-band on which the paging message and the dedicated synchronization signal are received is located in a middle of the entire system bandwidth of the base station.

4. The method of claim 1, wherein the sub-band on which the paging message and the dedicated synchronization signal are received is not located in a middle of the entire system bandwidth of the base station.

5. The method of claim 4, wherein, when the sub-band on which the paging message and the MTC-dedicated synchronization signal are received is not located in the middle of the entire system bandwidth of the base station, the first subframe on which the dedicated synchronization signal is received and the second subframe on which the paging message is received correspond to Multimedia broadcast/multicast service over Single Frequency Network (MBSFN) subframes.

6. A bandwidth reduced device comprising:
   a receiver configured to receive a dedicated synchronization signal from a base station on a first subframe before a second subframe which attempts to receive a paging message; and
   a processor operatively coupled with the receiver and configured to obtain a downlink synchronization with the base station based on the dedicated synchronization signal,
   wherein the processor attempts to receive the paging message after obtaining the downlink synchronization, and
   wherein the dedicated synchronization signal is received on a sub-band which is same as a sub-band on which the paging message is received, within an entire system bandwidth of the base station.

7. The bandwidth reduced device of claim 6, wherein a size of the sub-band on which the paging message and the dedicated synchronization signal are received corresponds to 6 physical resource block (PRBs) or 1.4 MHz.

8. The bandwidth reduced device of claim 6, wherein the sub-band on which the paging message and the dedicated synchronization signal are received is located in a middle of the entire system bandwidth of the base station.

9. The bandwidth reduced device of claim 6, wherein the sub-band on which the paging message and the dedicated synchronization signal are received is not located in a middle of the entire system bandwidth of the base station.

10. The bandwidth reduced device of claim 9, wherein, when the sub-band on which the paging message and the dedicated synchronization signal are received is not located in the middle of the entire system bandwidth of the base station, the first subframe on which the dedicated synchronization signal is received and the second subframe on which the paging message is received correspond to Multimedia broadcast/multicast service over Single Frequency Network (MBSFN) subframes.

* * * * *